Figure 1:
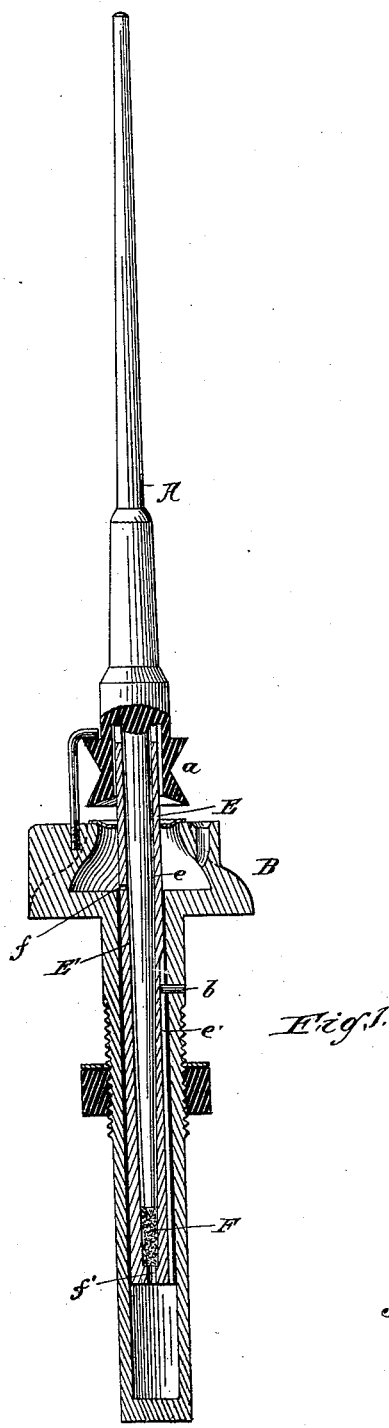

(No Model.) 2 Sheets—Sheet 1.

J. W. WATTLES.
BEARING FOR SPINNING SPINDLES.

No. 408,866. Patented Aug. 13, 1889.

WITNESSES:
O. W. Benjamin
Henry Carter

INVENTOR
Joseph W. Wattles
BY
Wm. H. Appleton
ATTORNEY

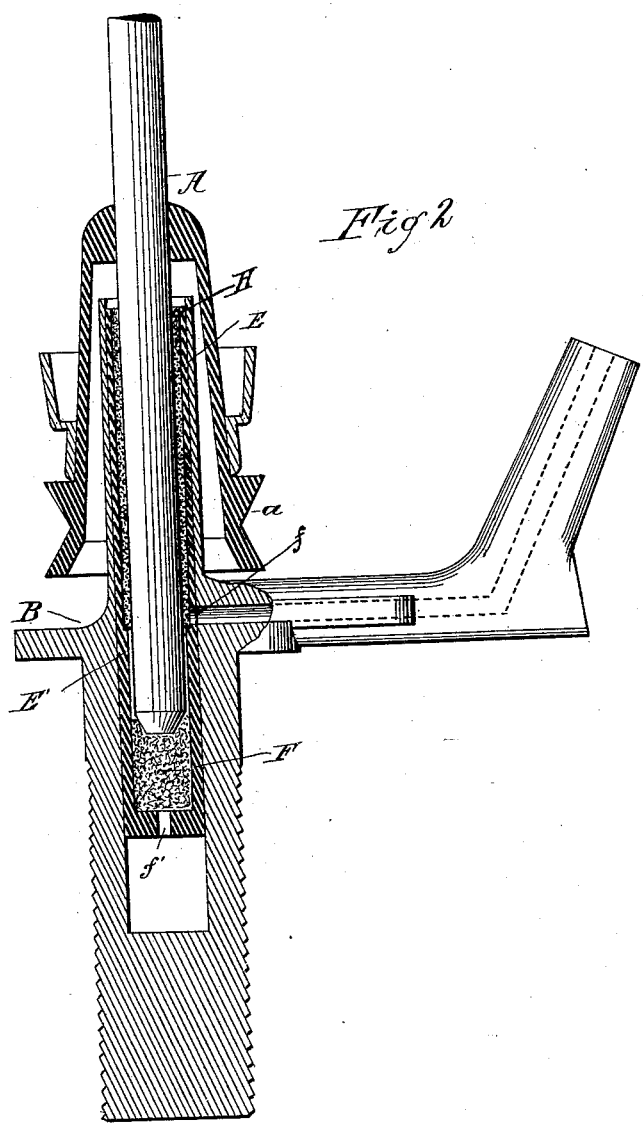

UNITED STATES PATENT OFFICE.

JOSEPH WARREN WATTLES, OF CANTON, MASSACHUSETTS.

BEARING FOR SPINNING-SPINDLES.

SPECIFICATION forming part of Letters Patent No. 408,866, dated August 13, 1889.

Application filed January 10, 1889. Serial No. 295,981. (No model.)

*To all whom it may concern:*

Be it known that I, JOSEPH WARREN WATTLES, a citizen of the United States, and a resident of Canton, county of Norfolk, and State of Massachusetts, have invented certain new and useful Improvements in Bearings for Spinning-Spindles, of which the following is a specification.

My invention relates to that class of spindle-bearings which are so constructed as to permit of the spindle when in operation traveling laterally under the influence of an unbalanced load, and especially to that class in which the bearings, instead of traveling laterally as wholes, when acted upon by the spindle, are distorted and yield thereto within themselves, the elastic properties inherent in the material out of which they are formed serving to return them to their normal and original form after the distorting forces have been removed.

In the manufacture of bearings of this class, as heretofore in use, vulcanized fiber, leather, cork, and materials respectively formed by compressing chemically-treated asbestus and felt impregnated with paraffine and a comminuted substance—such, for instance, as plumbago or soapstone—until rendered hard and rigid have been employed. These several materials, while answering to some of the conditions required, have been found deficient in others, principally because of the fact that some of the materials out of which the bearings were made have been so hard as not to yield with the proper facility to the strain upon them, while others when saturated with oil or other lubricant have been found to contract upon the spindle when the latter is at rest—as, for instance, at night—to such a degree as to grip the same and hold it from rotation when the machine is restarted.

The object of my invention is to obviate these and other defects; and to this end it consists in making the bearings of felt or other soft and yielding filamentous material—such, for instance, as wool, cotton, hair, and analogous materials—and in the arrangement of the same inconnection with the spindle and bearing supports, all as will hereinafter more fully appear.

Referring to the accompanying drawings, which form a part of this specification, Figure 1 is an elevation of a spindle and its supporting devices with my invention applied thereto, some of the parts being shown in section; and Fig. 2, a similar view of a slightly modified construction thereof, with the same parts shown in section as in the preceding figure.

In the drawings, having reference to Fig. 1, A indicates a spindle having the usual band-whirl $a$, and B a bolster-holder by means of which the spindle and its bearings are secured to the rail of the spinning or other machine. The parts as thus referred to are or may be of any of the ordinary and well-known constructions and require no further description herein.

E indicates the bolster-tube, which is provided with the usual bore or chamber E', extending from its upper to near its lower end, which latter is closed. The bore or chamber from its upper end to a point $e$ is constructed of the proper diameter to fit the spindle which is arranged therein, and serves as a lateral or bolster bearing therefor; and from the point $e$ to its lower end its diameter is somewhat larger than that of the portion of the spindle extending within the same, in order to allow of such portion moving laterally therein when required by the exigencies of the load upon the spindle or otherwise.

Located in the lower end of this bolster-tube is the step F, upon which the spindle rests. This step may be constructed of any soft filamentous material which will yield to the action of the spindle and afterward, when relieved from the disturbing forces, return to its original and normal form. I prefer, however, to make use of felt as being the best suited for this purpose, and to this end find it convenient to cut the felt into small circular disks and force them down into the orifice or chamber E to the position they will occupy therein, as shown in the drawings, leaving them at the same time soft and yielding.

As thus constructed, the bolster-tube E is preferably fitted to the socket in the holder B in such a manner that, while capable of being withdrawn therefrom when desired and afterward replaced, it shall be incapable of any lateral movement therein. To hold it at all times from rotation in the socket of the holder, and at the same time permit of its ready withdrawal from and replacement in the same, I make use of a pin $b$, which extends through the shank of the holder and engages with a groove $e'$, formed in the walls of the bolster-tube longitudinally thereof. The bolster-tube being thus arranged in the holder F, the lubrication of the spindle is effected by means of the oil-holes $f f'$, the former of which extends through the vertical wall of the tube and supplies the lubricant to the lateral or bolster bearing and the latter through the bottom of the tube to furnish the necessary lubricant to the step.

In the construction of parts as above set forth I have shown and described my invention as applied to a spindle-step only; but in Fig. 2 I have shown it used in connection with the lateral or bolster bearing as well. The construction presented in this figure—the several parts of which are identified by the same letters of reference as the preceding—is of a well-known form, the spindle being shown at A, its whirl at $a$, the bolster-holder at B, and the bolster at E. The lower end of the spindle in this case, as in the preceding, rests upon the soft yielding step F, but instead of being carried down to a sharp point, as illustrated therein, is made blunt, and is either semi-spherical in form or is so constructed as to lie in a plane at right angles to the axis of the spindle, or substantially so. Furthermore, the bore or chamber E' in the bolster-tube, instead of fitting the spindle at its upper end, will be counterbored, so as to enlarge the same, and a packing H, of felt or other soft yielding and elastic filamentous material, will be disposed therein and serve as a lateral or bolster bearing to the spindle.

By the means above described, as will be seen, I provide a bearing for spindles which, while closely fitted to the holder or receptacle in which it is placed, will, by reason of the peculiar properties and characteristics of the material out of which it is made, not only permit of the proper movements of the spindle to adapt itself to an unbalanced load, but also serve as a cushion for such spindle and neutralize any jar or vibration which may be engendered in the same by its rapid rotation.

I am aware that bolster-bearings made from both metal and hard rubber and immovably mounted in a holder or receptacle, with their upper end slitted so as to yield to the action of the spindle, are not new. These I do not claim. My bearings differ from them, as they do from all others, in this, that while the material employed therein is hard and unyielding in itself and the construction is such that only the flexible property of the material is availed of, my bearings are constructed of a soft, yielding, and elastic material, which readily submits to compression and afterward resumes its normal form when the distorting force has been removed.

While I have shown my invention as applied in connection with two old and well-known forms of spindles and their supporting devices, I wish it distinctly understood that I do not limit myself thereto, as it is obvious that the same may be used in connection with any other form or forms thereof without departing from the spirit thereof.

Having thus described my invention, what I claim as new, and desire to secure by Letters Patent of the United States, is—

1. A bearing for spindles constructed of a soft, yielding, and elastic filamentous material, substantially as described.

2. A bearing for spindles constructed of soft, yielding, and elastic felt, substantially as described.

3. The combination, with a spindle and supports therefor, of a bearing formed of a soft, elastic, and yielding filamentous material interposed between them, substantially as described.

4. A step for spindles formed of a soft, yielding, and elastic filamentous material, substantially as described.

In testimony whereof I have hereunto set my hand this 3d day of January, 1889.

JOSEPH WARREN WATTLES.

Witnesses:
N. W. DUNBAR,
WALTER AMES.